United States Patent [19]

Choon

[11] Patent Number: 5,410,553
[45] Date of Patent: Apr. 25, 1995

[54] ERROR CONCEALMENT CONTROL METHOD AND DEVICE OF DIGITAL VIDEO SIGNAL

[75] Inventor: Lee Choon, Seoul, Rep. of Korea

[73] Assignee: Goldstar Co., Ltd., Seoul, Rep. of Korea

[21] Appl. No.: 918,096

[22] Filed: Jul. 24, 1992

[30] Foreign Application Priority Data

Jul. 24, 1991 [KR] Rep. of Korea .................. 91-12662

[51] Int. Cl.$^6$ ................................. H04N 7/13
[52] U.S. Cl. ........................... 371/31; 382/56; 348/409; 348/415
[58] Field of Search ............ 371/30, 31; 358/135, 358/136, 166, 167, 133, 134; 382/56

[56] References Cited

U.S. PATENT DOCUMENTS

| | | | |
|---|---|---|---|
| 5,146,325 | 9/1992 | Ng ................................. | 358/135 |
| 5,185,819 | 2/1993 | Ng et al. ........................ | 382/56 |
| 5,212,549 | 5/1993 | Ng et al. ........................ | 358/135 |

FOREIGN PATENT DOCUMENTS

2163619A 2/1986 United Kingdom .

OTHER PUBLICATIONS

Zhu, "Coding and Cell-Loss Recovery in DCT-Based Pocket Video", IEEE Transactions on Circuits and Systems for Video Tech, vol. 3, No. 3, Jun. 1993.

Samt Girons, "MPEGtt A Robust Compression and Transport System for Digital HDTV", (IEEE 0-78-03-0593-0/92).

Gupta, "Joint Motion Compensated Prediction and Interpolation of Video Sequences," (IEEE 0-7803-05-32-Sep. 1992).

*Primary Examiner*—Roy N. Envall, Jr.
*Assistant Examiner*—Cameron H. Tousi
*Attorney, Agent, or Firm*—Morgan & Finnegan

[57] ABSTRACT

This invention relates to an error concealment system of digital video signal for concealing an error in the digital video signal of block coding system such as Moving Picture Experts Group(MPEG) system which is a standard for a video signal decoder. A method for concealing an error in a digital video signal of block coding system comprising the steps of judging whether or not an error is present in mode data, judging whether or not the mode is an intra mode in case when an error is not present in the mode data, checking the number of motion vectors having no error in case that said mode is a non-intra mode, and concealing the error by interpolating the blocks of past and future intra frame and predictive frame residing at the same position as the block with an error in case an error is present in the mode data or in case of error in the data in intra mode and in case where errors are present in all the motion vectors.

2 Claims, 5 Drawing Sheets

ERROR CONCEALMENT CONTROL METHOD AND DEVICE OF DIGITAL VIDEO SIGNAL

BACKGROUND OF THE INVENTION

The present invention relates to an error concealment for a digital video signal to conceal an error generated from the block-based video coding system such as Moving Picture Experts Group(MPEG) system.

In case of transmitting the compressed digital video signal via some channel, usually an error is generated on a transmission channel and this error causes a loss of image data during reconstruction of the video signal at the receiver side.

As a method for correcting such error, typically an error correcting code is sent, for example, a parity bit to the digital video signal. In accordance with this, it enables to reconstruct the picture by decoding matched to the error correcting code However, there is a limitation to the number of the correctable errors.

Accordingly, in case when any error is judged as, being uncorrectable at the decoder due to this limitation, an additional operation such as the error concealment.

As a typical method for the concealment of such an error, there is a method of substituting the error part by interpolating either using the neighborhood pixels within the same frame of by using the neighborhood pixels of its post frame. As an example of this a patent application filed and laid opened in Great Britain by SONY Corp. of Japan is described in the G.B.P. laid open publication No. 2.163,619A under the title of "Error concealment in digital television signal", and this is shown in FIG. 1 to FIG.3.

FIG. 1 is a schematic block diagram of a digital television signal reproducing system described in the aforementioned English patent laid open publication No. 2,163,619A. in which an error concealment is primarily executed at an error correcting section 2 with regard to a signal output from a digital video tape recorder( DVTR ) 1, and the error is amended during passing through an error amending section 3 consisting of a temporal error amending section 3a and a spatial error amending section 3b for the pixel where the correction of error is impossible.

Operation of the error amending section 3 will be described with reference to the FIG. 2 which shows a sample arrangement at positions corresponding to two consecutive frames in a television video signal. Here, S1 to S8 and EO represent nine pixels of a present frame, and S1D to S8D and EOD represent pixels of past frame respectively.

The pixels S1 to S8 of the present frame are subtracted from the corresponding pixels of the past frame to judge whether or not the temporal amendment is suitable, by the subtracters 27 to 34 of FIG. 3 which is the detailed block diagram of the system shown in FIG. 1. Then the differential signals of the subtracters 27 to 34 are input to Programmable Read Only Memories ( PROMs ) 35 to 42, and the signals input from these subtracters 27 to 34 are scaled at the PROMs 35 to 42.

At this moment, the PROMs 35 to 42 refer an error flag coming out of OR gate 44, and this error flag becomes "1" when any error is present in any pixel of the pixel S1 or the pixel S1D and when the error flag is "1", the PROM 35 outputs "0". Remaining PROMs 36 to 42 also operate by same method.

The outputs of the PROMs 35 to 42 are added by an adder 46 and input to a PROM 47 and thereby scaled.

The output of the prom 47 is input to a PROM 48 and at this moment, it is judged whether or not it is substituted by a pixel EO delayed by one frame. Here, three conditions are involved for executing the temporal error amendment. First, the error flag should inform that present pixel EO is an error, second a pixel EO delayed by one frame has to have no error, and third the output of the PROM 47 should not exceed a predetermined limitation.

Since the conventional error concealment system conceals an error on the pixel by pixel, it has a disadvantage that it can be applied only to the video compressing systems such as pulse code modulation( PCM ) or differential pulse code modulation( DPCM ). Because the video compressing system for digital storage media( DSM ) presently offered by MPEG encodes by using a block-based coding system such as motion compensation( MC ) and discrete cosine transform( DCT ), the error is produced in a block units. Also since the motion compensation is executed, the error in the motion vector should be considered as well as in the picture data. Therefore the error concealment system in pixel units as described above becomes impossible to use.

And, as described above, the error concealment system in pixel units can not share the circuits used in the conventional coding system, and since a complicated circuit is involved, there is a problem of high cost.

The video signal compression method of MPEG will be described as follows. One frame is divided into units called macro blocks and transmitted in macro block units. Also there is a picture mode which discriminates whether the transmitted frame is either an intra-mode or a non-infra mode (e.g., a predictive mode and bidirectional mode). The picture mode tells whether the pixels of other frame needs to be considered or not. In macro block units, other data, i.e., data such as the motion vector or picture information, are encoded all together and transmitted.

In detail, the frame is classified into an intra frame, a predictive frame and a bidirectional frame.

The intra frame means a frame was DCT coded by considering only a redundancy within its frame without considering the differences from other frames;

the predictive frame means a frame which has only forward motion vectors, and DCT coding is applied to the difference from the corresponding prediction block in the prior intra frame or in the predictive frame referred by the motion vectors: and the bidirectional frame means a frame for coding the block data which is either interpolated from both the past and future frame by utilizing both of the forward and reverse motion vectors from the past frame and the future frame or substituted from or either of the two frames by utilizing the motion vectors of one direction.

Since the bidirectional frame and the predictive frame successively following the intra frame are encoded based on the intra frame, in case any error occur in the intra frame, the bidirectional frame and the predictive frame are reconstructed on the basis of the erroneous intra frame during decoding. Therefore the error in the intra frame is propagated through the future frames. And, also in case when the error is occurred in the predictive frame, as described above, the past and future bidirectional frame and the predictive frame can not be reconstructed perfectly.

On the other hand, in case when an error is generated in the bidirectional frame it has a tendency to be limited to its own frame without being propagated to other frames.

When the error is generated in this bidirectional frame, particularly when the error cannot be corrected by the error correction decoder because its error correcting capability is exceeded, it should be compensated in the macro block unit the erroneous macro block can be concealed by interpolation, utilizing the macro block of past or future intra frame or predictive frame which is present at same position as a block in which an error is generated.

The Following can be used for such interpolation.

$$Si(x1,y1) = A\, S1(x2,y2) + (1-A)Sm + 1(x3,y3)$$

$$A = \frac{(m+1-i)}{m} \quad (1)$$

This represents a case that the predictive frame or the intra frame is present at 1 and (m1) on a time axis and the macro block of the bidirectional frame to be interpolated is present at i position.

Si is a pixel value of the block to be presently interpolated,

S1 is a corresponding pixel value of the past frame, x,y represent respectively the position of the pixel.

When the macr blocks in the frames 1,i, m+1 are in the same spatial position it becomes as x1=x2=x3, y1=y2=y3

SUMMARY OF THE INVENTION

An object of the present invention is to provide an error concealment method for a digital video signal wherein an error is concealed by utilizing an information signal from the error correction decoder regarding to a macro block in which an error is generated.

Another object of the present invention is to provide an error correcting device for a digital video signal wherein an error concealed by utilizing an information signal from the error correction decoder regarding to a macro block in which an error is generated.

A feature of the present invention for attaining these objects resides in an error concealment method of digital signal comprising:
- a step for judging whether or not an error is present in a mode data among an information signal of a macro block unit,
- a step for judging whether or not the mode is an intra mode in case when an error is not present in the mode data,
- a step for checking the number of motion vectors having no error in case of non-intra mode,
- a step for substituting the macro block designated by the motion vector when the number of error-free motion vector is 1, and for interpolating the macro blocks designated by the motion vectors when the number is 2, and
- a step for interpolating the past and future intra frame or predictive frame being present at a same position corresponding to the macro block with an error in case where an error is present in mode data or the macro block is an intra mode or in case where an error is present in all motion vectors.

Another feature of the present invention resides in an error correcting device of digital video signal comprising:
- digital storage media,
- an error correcting section correcting the error in the digital video signal from said DSM and outputting the error signal to other output terminal in case when the error correction is impossible,
- a decoding section for decoding the digital video signal which is connected to an input terminal of said error correcting section and error-corrected, and
- an error concealment control section which receives said error signal of said error correcting section and outputs the error concealment control signal to said decoding section so as to conceal a bidirectional frame corresponding to said error signal in accordance with a mode information generated at said decoding section.

DETAILED DESCRIPTION OF THE INVENTION

Hereinafter, the present invention will be described in detail with reference to the accompanying drawings.

Figure 1:
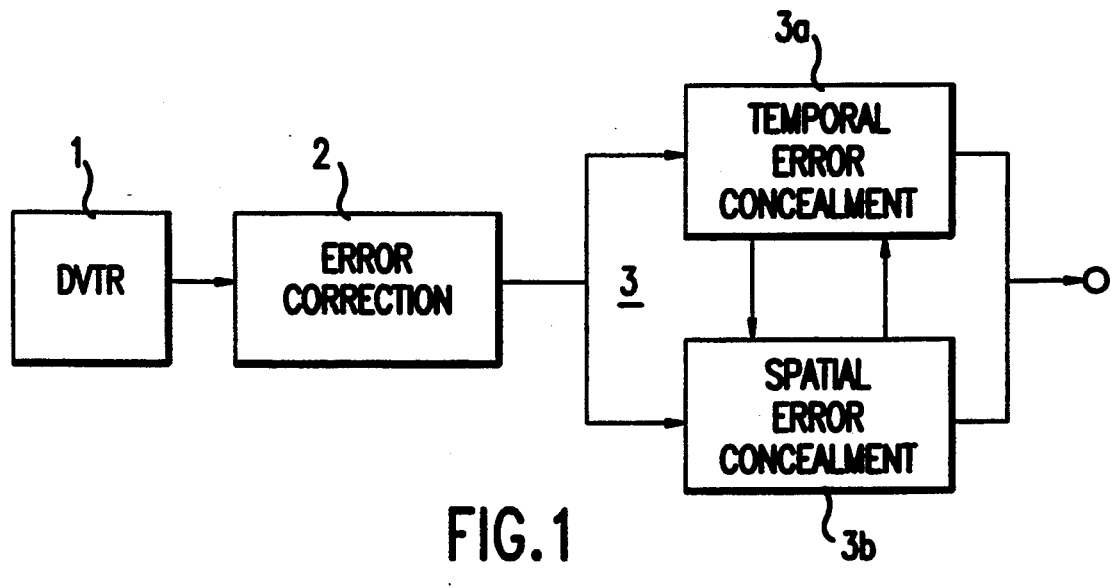
FIG. 1 is a schematic block diagram of a conventional digital television signal reproducing device.
Figure 2:
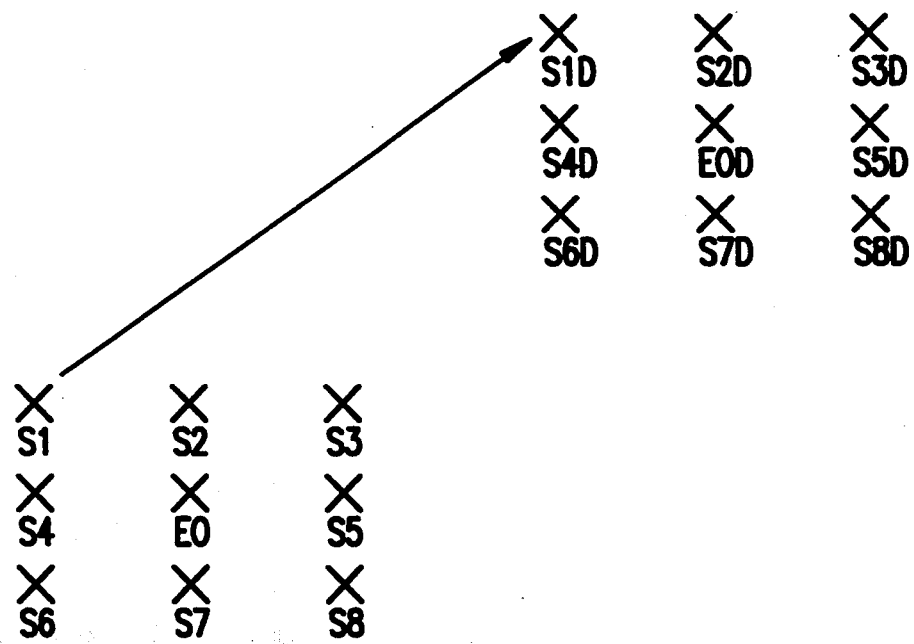
FIG. 2 is a diagram showing a sample arrangement of successive two frames for explaining an operation of FIG. 1.
Figure 3:
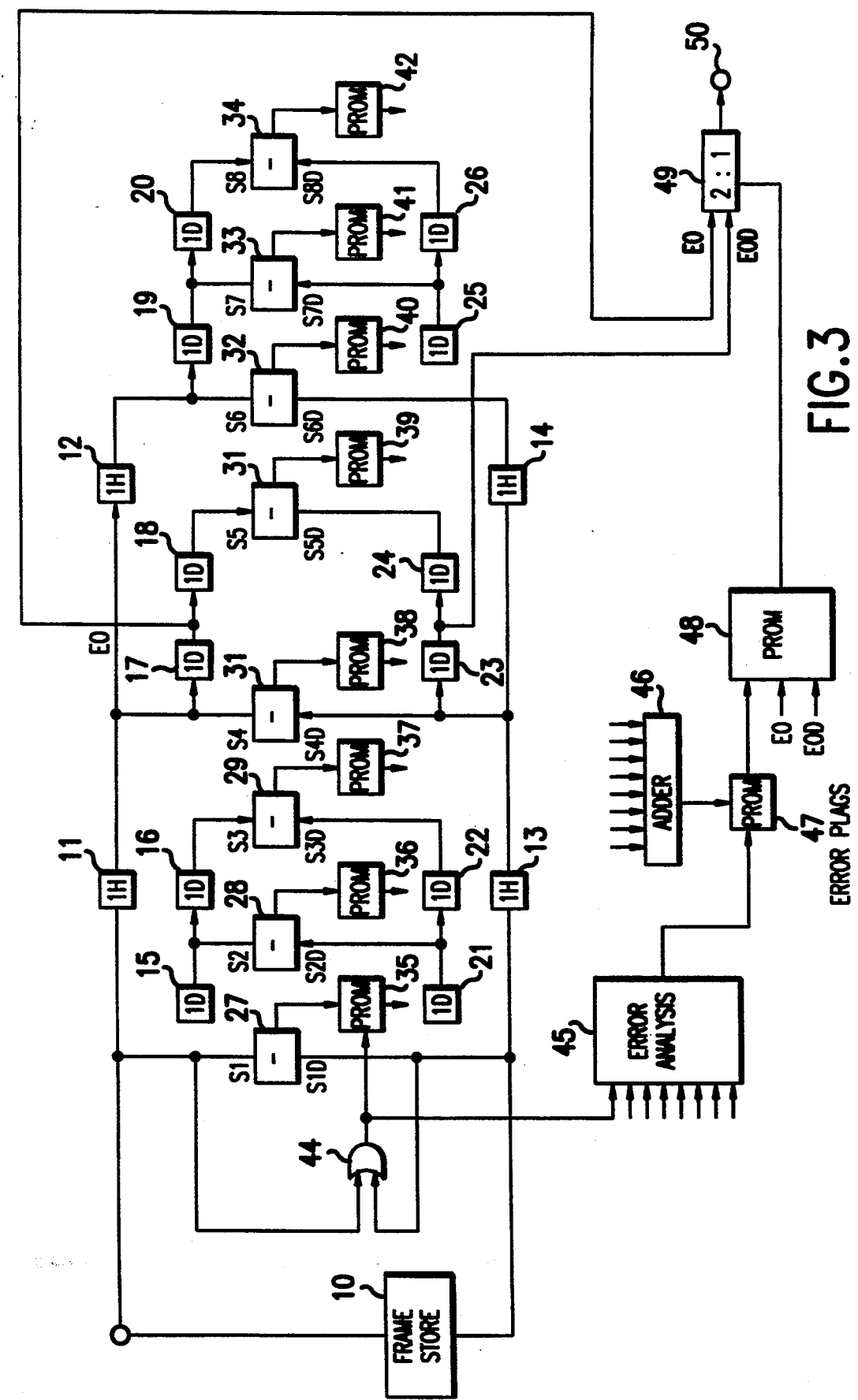
FIG. 3 is a detailed block diagram of FIG. 1.
Figure 4:
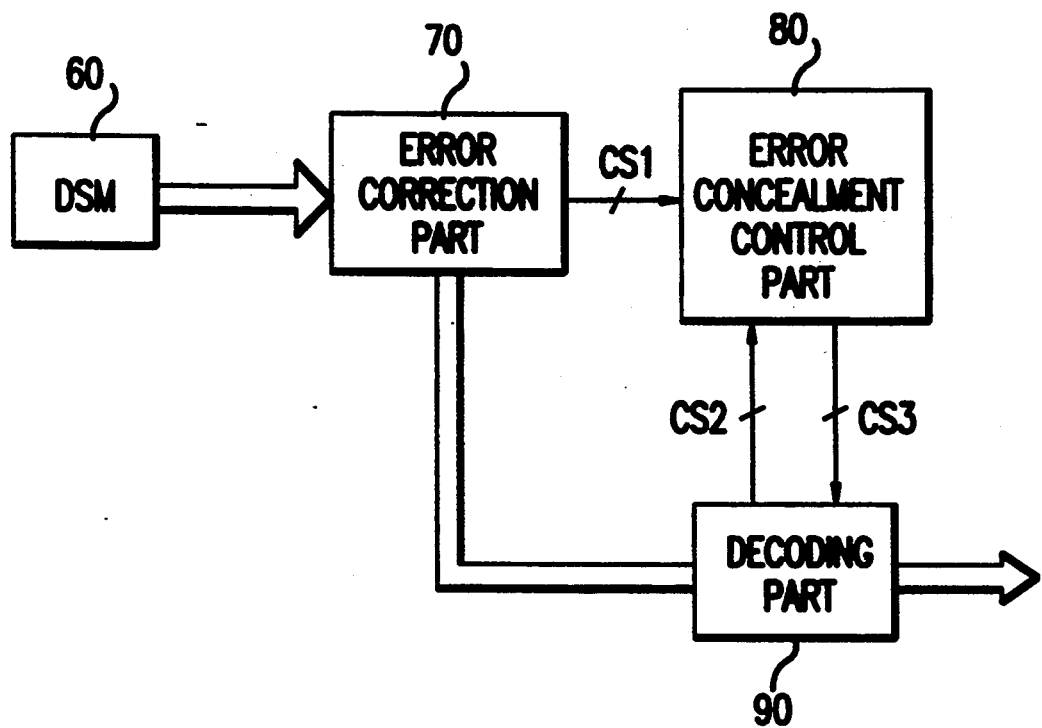
FIG. 4 is a block diagram of an error concealment device of digital video signal according to the present invention.
Figure 5:
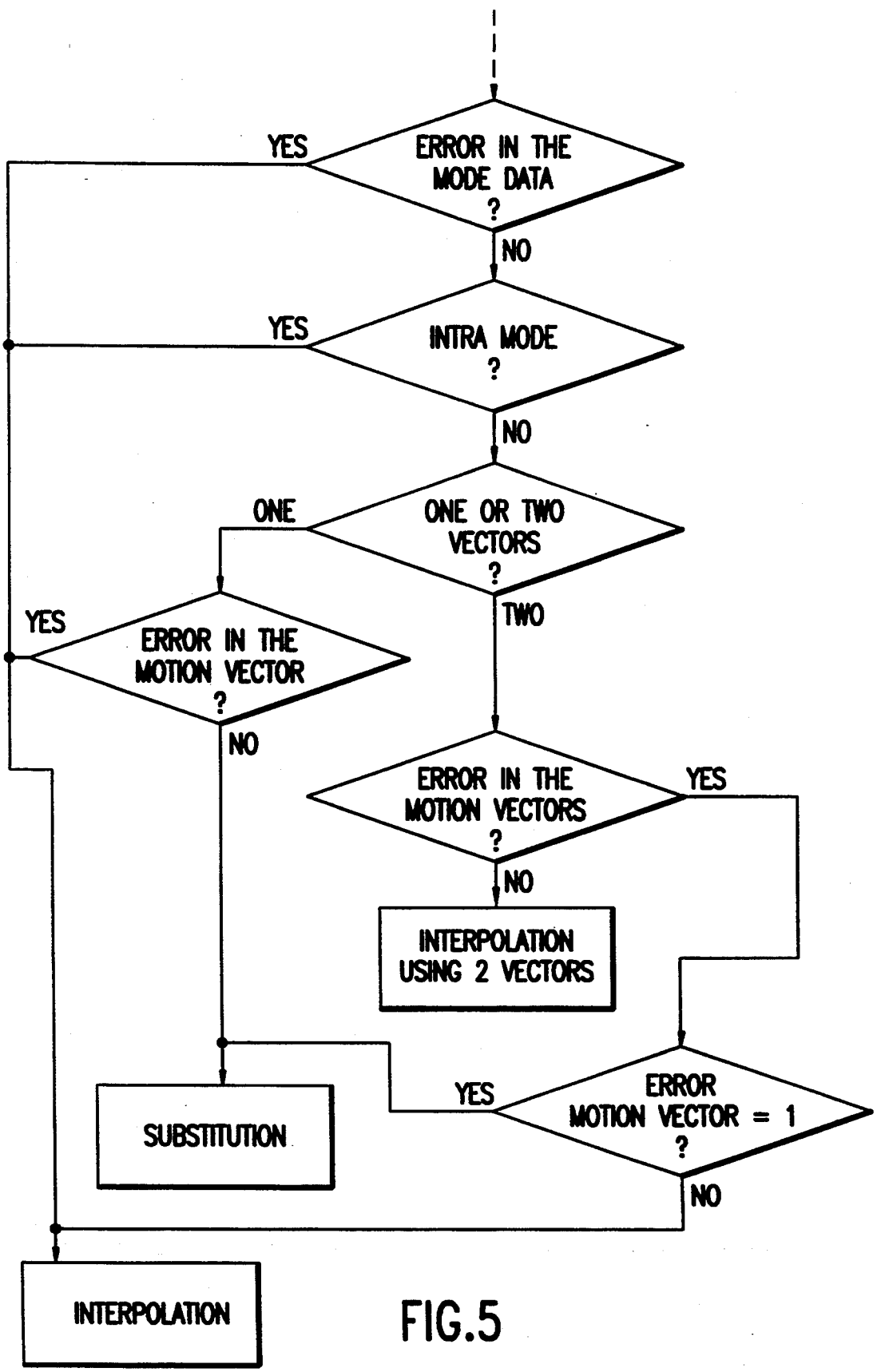
FIG. 5 is a flow chart for explaining an error concealment method of digital video signal according to the present invention.

FIG. 4 shows a block diagram of the error concealment device of digital video signal in accordance with the present invention, which comprises a DSM 60 recorded with a digital video signal coded by a block coding system such as transform coding, an error correcting section 70 which receives an output digital video signal from the DSM 60 and decodes an error control code and outputs to one output terminal correcting the error up to its error correcting capability and outputs the error signal CS1 to other output terminal in case when the correction is impossible: a decoding section 99 which outputs to one output terminal by decoding the digital video signal from one output terminal of the error correcting section 70 and outputted therefrom and simultaneously outputs the mode information CS2 to other output terminal: and an error concealment control section 80 which is connected to the other output terminal of the error correcting section 70 applied with the error signal CS1 and outputs an error concealment signal CS3 to the decoding section 90 such that the error concealment is possible in accordance with the mode information CS2 generated at the decoding section FIG. 5 shows a diagram for explaining the error concealment method of bidirectional frame in accordance with the present invention, in which when an uncorrectable error is generated in this frame, firstly judges whether or not an error is present in the mode data (step 100), and when an error is present, since this means to compensate a macro block, by interpolation of the blocks being present at the same position in its past and future intra frame or the predictive frame which is a conventional error correcting method (step 900), and when an error is not present in the mode data, judges whether or not it is the intra mode (step 200). In case of the intra mode since the data of its block has no relation to other frames, the whole block should be compensated, therefore an interpolation (step 900) as above is executed and corrected, and in case of non-intra mode, judges whether one of forward vector and reverse vector is present or both of two are present (step 300). In case where one of the forward vector and reverse vector is present, judges whether an error is present in its motion vector (step 500), and when an error is present, executes the interpolation (step 900), and when an error is not present in the motion vector, the macro block is substituted with the macro block by the remaining valid one motion vector (step 600). In case where the forward vector and the reverse vector are all present in the above-described step 300, judges whether or not an error is present in its two motion vectors (step 400), and when no error is present executes the interpolation by using its two motion vectors (step 700).

The interpolation here (step 700, step 900) can utilize the expression (1) by applying expression(1) in macro block units, and the interpolation by the step 900 should satisfy x1=x2=x3, y1=y2=y3 in said expression, and the interpolation by the step 700 may use the macro blocks in the same position of the present frame or in the different position designated respectively by two motion vectors.

That is x1, x2, x3, may be identical or different in the expression (1), and y1, y2, y3, also may be identical or different each other.

On the other hand it judges whether or not an error is present only in one motion vector of two motion vectors at the above-described step 400 (step 800), and in case that an error is present only in one motion vector, substitutes by a block designated by one motion vector (step 600), and in case that an error is present at both of two motion vectors, execute the interpolation (step 900).

Figure 6:
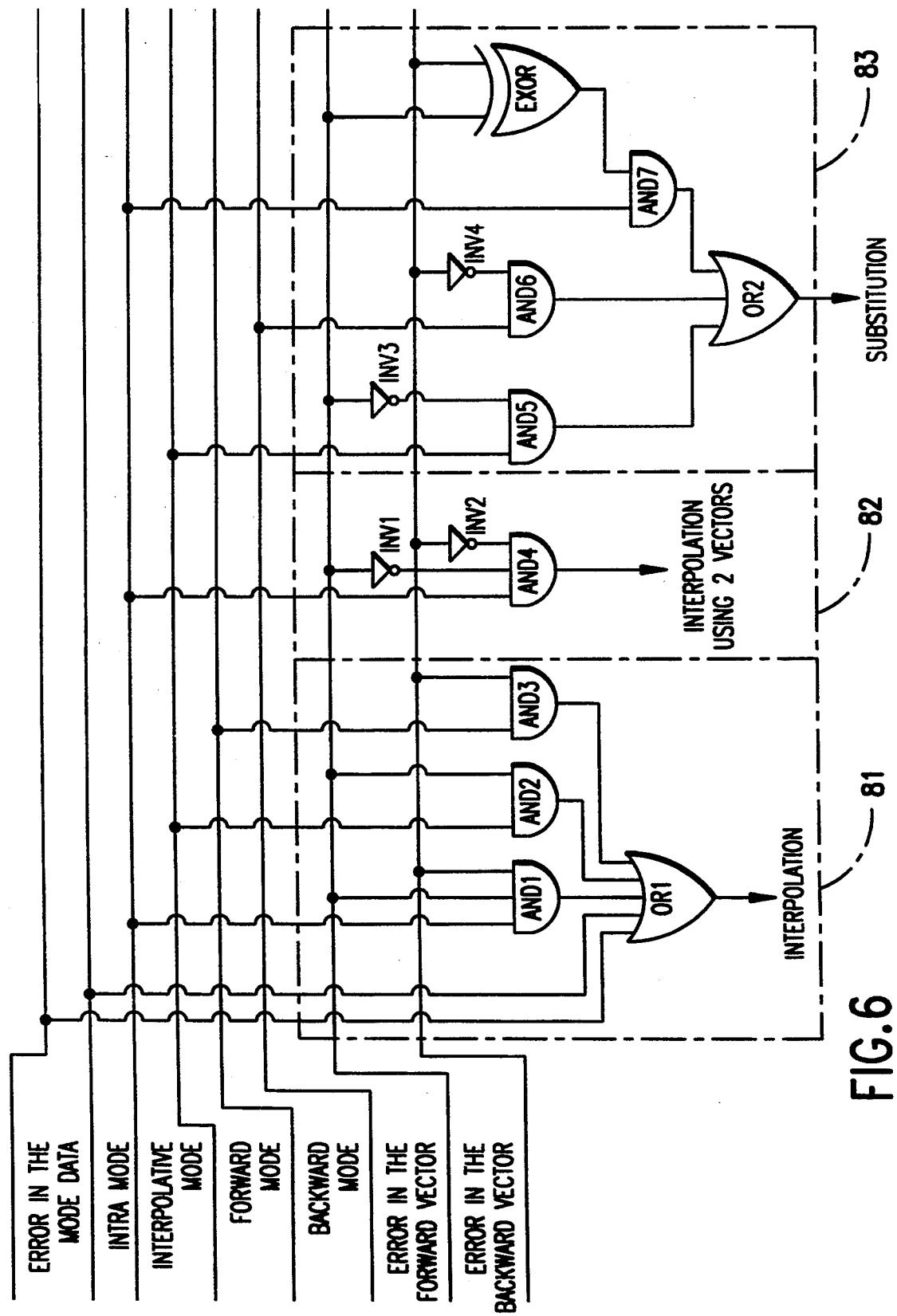
FIG. 6 is a circuit diagram of a concrete example of an error concealment control section shown in FIG. 4.

FIG. 6 shows a circuit diagram of an example of the error concealment control section in accordance with the present invention of FIG. 4, which includes: a interpolation signal generating circuit 81 including OR gate OR1 which is to be input with respective output signals of AND gate AND1 to be input with the interpolation mode signal and the forward and backward vector error signal, AND gate AND2 to be input with the forward mode signal and the forward vector error signal and AND gate AND3 to be inputted with the backward mode signal and the backward reverse vector error signal and which is to be input with an error signal of a mode information and the intra mode signal, and for executing the interpolation by utilizing the block of past and future predictive frame PF or the intra frame IF being present at same position as a block generated with an error: a second interpolation signal generating circuit 82 including AND gate AND4 to be input with the forward and backward vector signal and the interpolation mode signal, and for executing the interpolation by using the motion vector of the forward and backward vector: and a substitution signal generating circuit 83 including OR gate OR2 which is to be input with respective output of AND gate AND5 to be input with the forward vector signal and the forward mode signal. AND gate AND6 to be inputted with the backward vector signal and the backward mode signal, and AND gate AND7 to be input with the interpolation mode signal and a signal in which the forward vector signal and the backward vector signal are exclusively ORed by EXOR gate EXOR, and for substituting by a designating block among the forward motion vector and the backward motion vector. This circuit shows that the error concealment controlling circuit 80 of the present invention can Be embodied by simple logical elements, and it is a natural matter to those who skilled in the art that it can be embodied by other logical elements.

As described above, in accordance with the present invention, in a video signal processing of the block coding system, the error signal output from the error correcting section and the mode information output from the decoding section are combined so that the error concealment of the digital video signal becomes possible in accordance with the data, and particularly since i t can be designed simply by logical element as shown in FIG. 6 there is advantage that the circuit design is easy. In this invention, although it is explained for the error concealment of the bidirectional frame, it is a matter of course that it can also be applied to the error correct ion of the predictive frame using the combination of the error signal and the mode information.

Although the invention has been described in conjunction with specific embodiment, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A method for concealing an error in a digital video signal coded by a block band video coding system comprising the steps of:

(a) determining whether or not an error is present in a mode data of a macro block;

(b) determining whether or not the mode data is intra mode in case that the error is not present in the mode data;

(c) checking the number of motion vectors having no error in case that the mode data is non-intra mode and concealing the error by the number of error-free motion vectors;

(d) concealing the error by interpolating blocks of past and future intra frame or predictive frame residing at same position as the macro block of a frame having the error;

(e) concealing the error by substituting a macro block designated by the motion vector in the past or future intra frame or predictive frame when the number of error-free motion vector is one, and (f) concealing the error by interpolating blocks respectively designated by the notion vectors from the past or future intra frame or predictive frame when the number or error-free motion vectors is two;

said interpolating being performed to conceal the error only in case any one of the following conditions occur (1) the error is present in the mode data, (2) the mode data is in an intra mode, and (3) the error is present in all motion vectors.

2. A device from concealing an error in a digital video signal of block coding system comprising:

digital storage media;

an error correcting means having first and second output terminals, said error correcting means outputting to its first output terminal an error-corrected digital video signal from said digital storage media and outputting an error signal to the second output terminal to indicate that error correction is impossible;

a decoding means having an input terminal and first and second output terminals, said input terminal is connected to the first output terminal of said error correcting means, and said decoding means outputs to its first output terminal a decoded, error-corrected digital video signal, and outputs mode information to its second output terminal; and an error concealment control means which is responsive to said error signal of said error correcting means and outputs an error conceal signal to said decoding means in order to conceal the errors in bidirectional frame in accordance with the mode information generated at said decoding means;

wherein said error concealment control means comprises a first interpolation signal generating circuit for the interpolation of the blocks of past or future predictive frame or intra frame which reside at an identical position to a block generated with an error in response to said mode information, a second interpolation signal generating circuit for the interpolation of blocks indicated by the forward and backward motion vectors in response to said mode information, and a substitution signal generating circuit for substituting the erroneous blocks with the block designated by the forward vector and the backward vector in response to said mode information.

* * * * *